United States Patent [19]

Yanchak

[11] Patent Number: 4,907,205
[45] Date of Patent: Mar. 6, 1990

[54] METHOD FOR ATTENUATING MULTIPLE REFLECTION EVENTS IN SEISMIC DATA

[75] Inventor: Dennis A. Yanchak, Richmond, Tex.

[73] Assignee: Amoco Corporation, Chicago, Ill.

[21] Appl. No.: 188,780

[22] Filed: Apr. 29, 1988

[51] Int. Cl.$^4$ .......................... G01V 1/36; G01V 1/20
[52] U.S. Cl. ........................ 367/52; 367/24; 367/53; 367/63; 364/421
[58] Field of Search ............... 367/24, 46, 52, 53, 367/59, 63; 364/421

[56] References Cited

U.S. PATENT DOCUMENTS

| | | | |
|---|---|---|---|
| 4,380,059 | 4/1983 | Ruehle | 367/24 |
| 4,628,491 | 12/1986 | Bodine et al. | 367/24 |
| 4,646,239 | 2/1987 | Bodine et al. | 367/52 |
| 4,665,510 | 5/1987 | Foster et al. | 367/24 |
| 4,736,347 | 4/1988 | Goldberg et al. | 367/46 |
| 4,766,574 | 8/1988 | Whitmore et al. | 364/421 |

OTHER PUBLICATIONS

Ryu, Jisoo V., "Decomposition of Seismic Gathers Into Velocity Components by a Space-Time Filter", 50th Annual International Meeting SEG, Houston, Tex., Nov., 1980.

Meyerhoff, H. J., "Two Dimensional Filtering of Seismic Data", University of California, Berkeley, Mar., 1967.

Primary Examiner—Nelson Moskowitz
Attorney, Agent, or Firm—Timothy D. Stanley

[57] ABSTRACT

A method is described for enhancing seismic data and, more particularly, for attenuating multiple reflection events in seismic data. Seismic data are sorted into common endpoint gathers, and selected multiple reflection events are corrected for time delays associated with the reflection of the seismic energy from common reflecting interfaces and aligned. The aligned multiple reflection events are attenuated and the resulting enhanced seismic data can then be inverse time-delay corrected for subsequent processing, including repetitions of the aligning and attenuation steps to suppress additional multiple reflection events in the seismic data.

10 Claims, 5 Drawing Sheets

△ = RECEIVER
▷ = SOURCE

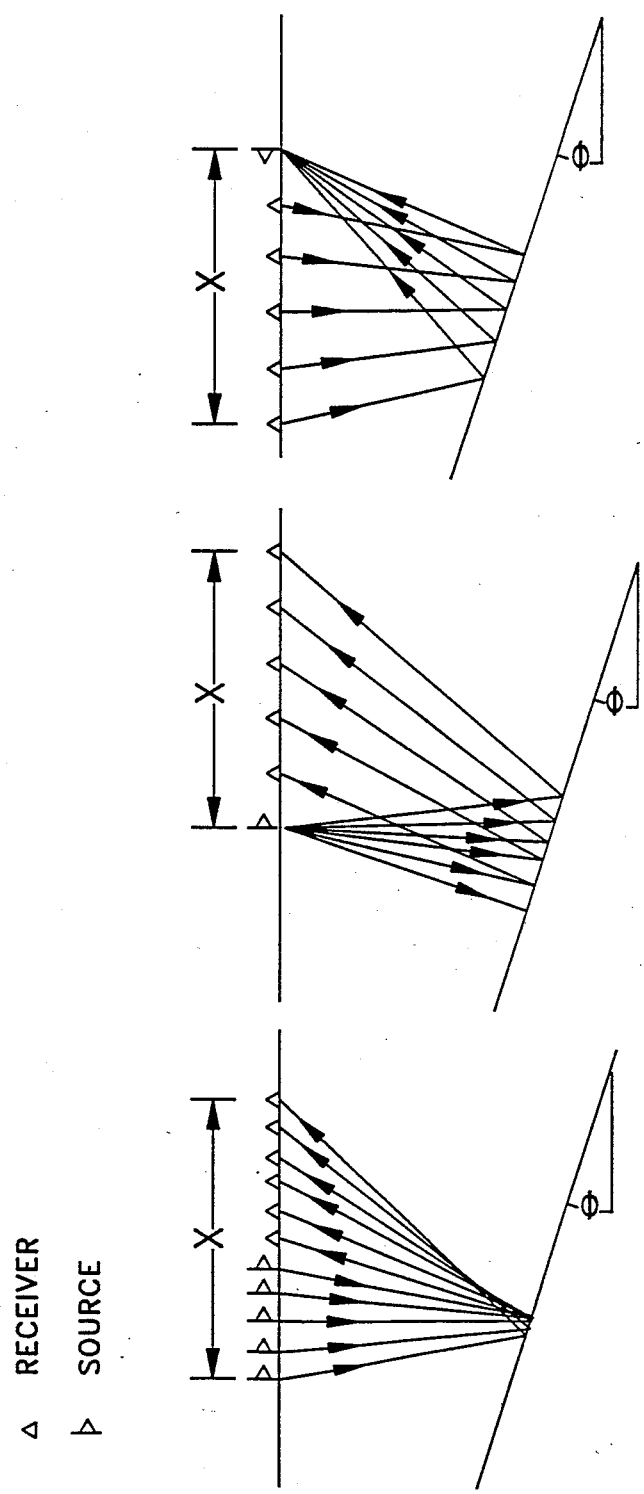

METHOD FOR ATTENUATING MULTIPLE REFLECTION EVENTS IN SEISMIC DATA

BACKGROUND OF THE INVENTION

The present invention relates generally to a method for enhancing seismic data and more particularly to a method for attenuating multiple reflection events in seismic data.

In seismic prospecting, it is conventional to place a plurality of seismic receivers along the earth's surface at spaced locations. A plurality of seismic sources disposed at spaced locations along the earth's surface can then be activated to generate seismic waves which propagate outwardly in all directions. Vibrating devices, explosive devices and impulsive devices are all exemplary of such seismic sources. The seismic waves this generated are reflected, refracted and diffracted from subsurface formation interfaces, and some of these diverted seismic waves are detected by the seismic receivers and can be processed to form a seismic signal. Such seismic signals can be displayed as seismic sections which contain information about the time, duration and intensity of the diverted seismic waves. Seismic sections can be studied to extrapolate information regarding the type and location of subsurface formations producing the diverted seismic waves. This information can, in turn, be employed to evaluate the subsurface formations for oil- and gas-bearing properties.

Seismic energy which has generally been reflected only once from a reflecting subsurface interface is commonly referred to as a primary, whereas, seismic energy which has been reflected more than once from a reflecting subsurface interface is commonly referred to as a multiple. Such reverberating seismic energy can produce multiple or secondary reflection events in the seismic data from one or more reflecting interfaces in the earth. Consequently, the presence of multiple reflection events or more simply, multiples, in the seismic data can result in confusing and, oftentimes, noninterpretable seismic data.

One method for suppressing multiple reflection events in seismic data is to sort the seismic data into common depth point (CDP) gathers of seismic signals and then normal moveout correct and sum the moveout corrected seismic signals of the CDP gather. The utility of this technique depends upon differences in the moveout velocities for primary and multiple reflection events so as to cause primary reflection events to be reinforced and the otherwise coherent seismic energy represented by multiple reflection events to become less coherent and thus amenable to attenuation by summation of the moveout corrected seismic signals in a CDP gather. However, once this technique has been applied to a CDP gather of seismic signals, further repetitions are not possible because one cannot "unstack" the stacked signals. Moreover, stacking the seismic data precludes the use of recently developed seismic data processing techniques for evaluating range dependent amplitude (RDA) variations as set forth by Bodine, et al., in U.S. Pat. No. 4,646,239.

Alternatively, J. Ryu described in "Decomposition of Seismic Gathers into Velocity Components by a Space-Time Filter," 50th Annual SEG International Meeting (Nov. 17-21, 1980), a method for identifying and isolating various reflection events in common depth point gathers of seismic data to remove unwanted reflection events. In particular, Ryu describes overcorrecting primary reflection events and undercorrecting multiple reflection events for normal moveout to first separate multiples from primary reflection events and then employing a two-dimensional (space time) filter to suppress the multiples. Such technique, however, is dependent upon differences in normal moveout velocities for multiples and primary reflection events.

The present invention provides a novel method for attenuating multiple reflection events in seismic data which overcomes the shortcomings of the above-described techniques. More particularly, the present invention sorts the seismic data into common endpoint gathers whereby differences in normal moveout velocities for primary and multiple reflection events as well as differences in structural dip for primary and multiple reflection events can be employed to suppress multiples. Additionally, since the present invention does not depend upon summation techniques to attenuate multiples, the process can be repeated as often as desired to suppress additional multiples having differences in normal moveout velocity and/or structural dip.

SUMMARY OF THE INVENTION

The present invention relates generally to a method for enhancing seismic data and more particularly to a method for attenuating multiple reflection events in seismic data. The seismic data are sorted into common endpoint gathers of seismic signals and moveout corrected to align selected multiple reflection events therein. The aligned multiple reflection events can then be attenuated to provide enhanced seismic data. The enhanced seismic data can then be inverse moveout corrected for further processing of the common endpoint gathers of seismic signals. Such additional processing can include range dependent amplitude analysis, as well as a repetition of the steps of moveout correction and attenuation to suppress other multiple reflection events in the seismic data. Thus, the present invention provides at least two novel advances in enhancing seismic data whereby two or more repetitions of multiple reflection event attenuation can be applied to the seismic data and the capability of attenuating multiples in the seismic data yet retaining the individual seismic signals of the gather for subsequent processing.

BRIEF DESCRIPTION OF THE DRAWINGS

FIG. 3 is a representation of seismic wave ray paths for a common depth point gather of seismic signals from a flat, inclined reflecting interface;

FIG. 4 is a representation of seismic wave ray paths for a common endpoint gather of seismic signals shooting downdip from a flat, inclined reflecting interface;

FIG. 5 is a representation of seismic wave ray paths for a common endpoint gather of seismic signals shooting updip from a flat, inclined reflecting interface;

DETAILED DESCRIPTION OF THE PREFERRED EMBODIMENT

The present invention relates generally to a method for enhancing seismic data and more particularly to a method for attenuating multiple reflection events in seismic data.

Figure 2:
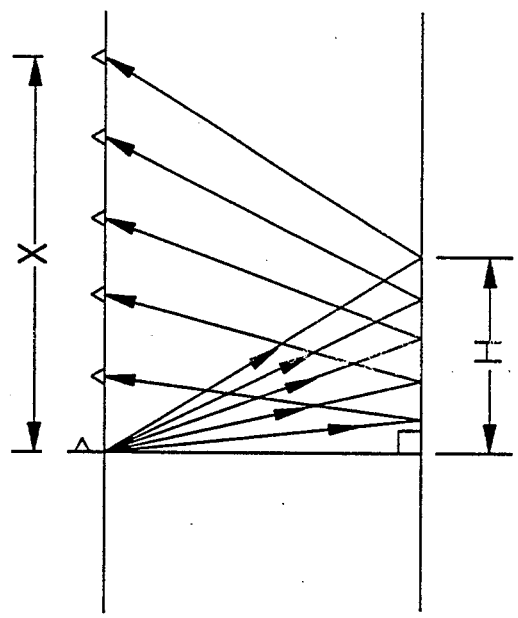
FIG. 2 is a representation of seismic wave ray paths for a common endpoint (CEP) gather of seismic signals from a flat, horizontal reflecting interface.
Figure 1:
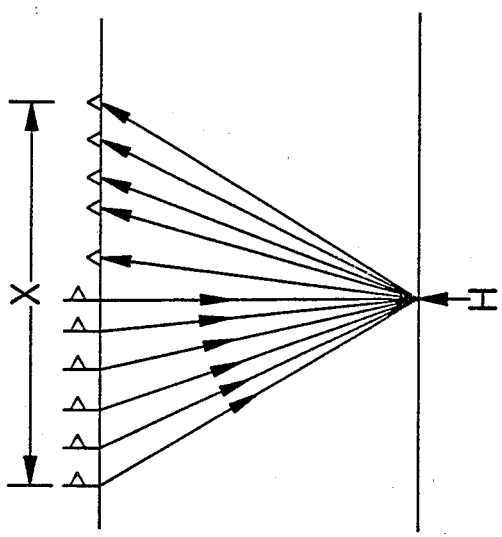
FIG. 1 is a representation of seismic wave ray paths for a common depth point (CDP) gather of seismic signals from a flat, horizontal reflecting interface.

In order to better understand the present invention, the following introductory discussion is provided. In seismic data acquisition, multiple seismic signals for a common reflection point can be recorded by sets of seismic receivers to seismic energy imparted by seismic sources. For flat, horizontal reflecting interfaces in the earth's subsurface, FIG. 1 depicts a seismic acquisition technique generally referred to in the art as common depth point (CDP), whereby the ray paths from the seismic sources to the seismic receivers are depicted as reflecting from a common reflection point H. Consistent with current geophysical notation, source locations are indicated by flag symbols and receiver locations are indicated by triangle symbols. Each seismic source and receiver pair generating a seismic signal are separated by a unique distance X sometimes referred to as offset. Additionally, seismic data can be obtained employing common endpoint (CEP) techniques whereby the seismic data represent a collection of seismic signals recorded either by a plurality of seismic receivers to seismic energy imparted by a common seismic source or by a common receiver to seismic energy imparted by a plurality of seismic sources. For flat, horizontal reflecting interfaces in the earth's subsurface, FIG. 2 depicts such common endpoint technique whereby the ray paths from the seismic source to the seismic receivers are depicted as reflecting from a reflection area H. An obvious difference in CDP and CEP seismic techniques is the tendency of CEP seismic data to smear the image of the reflecting interface over a broader area than the CDP seismic technique. Such smearing of images has, thus, generally detracted from widespread application of the common endpoint seismic technique; however, even the CDP seismic technique can exhibit such smearing as will be discussed below.

Looking now to FIGS. 3, 4, and 5, the differences in seismic energy ray paths reflecting from a flat, inclined reflecting interface for both CDP and CEP seismic techniques are represented. Each of the flat, inclined interfaces has a dip angle of $\theta$. For flat, inclined reflecting interfaces, the common depth point seismic technique also tends to smear the image of the reflecting interface as depicted in FIG. 3. Additionally, FIG. 4 depicts the common endpoint seismic technique "shooting" downdip, and FIG. 5 depicts the common endpoint seismic technique "shooting" updip both for flat, inclined reflecting interfaces.

Figure 6:
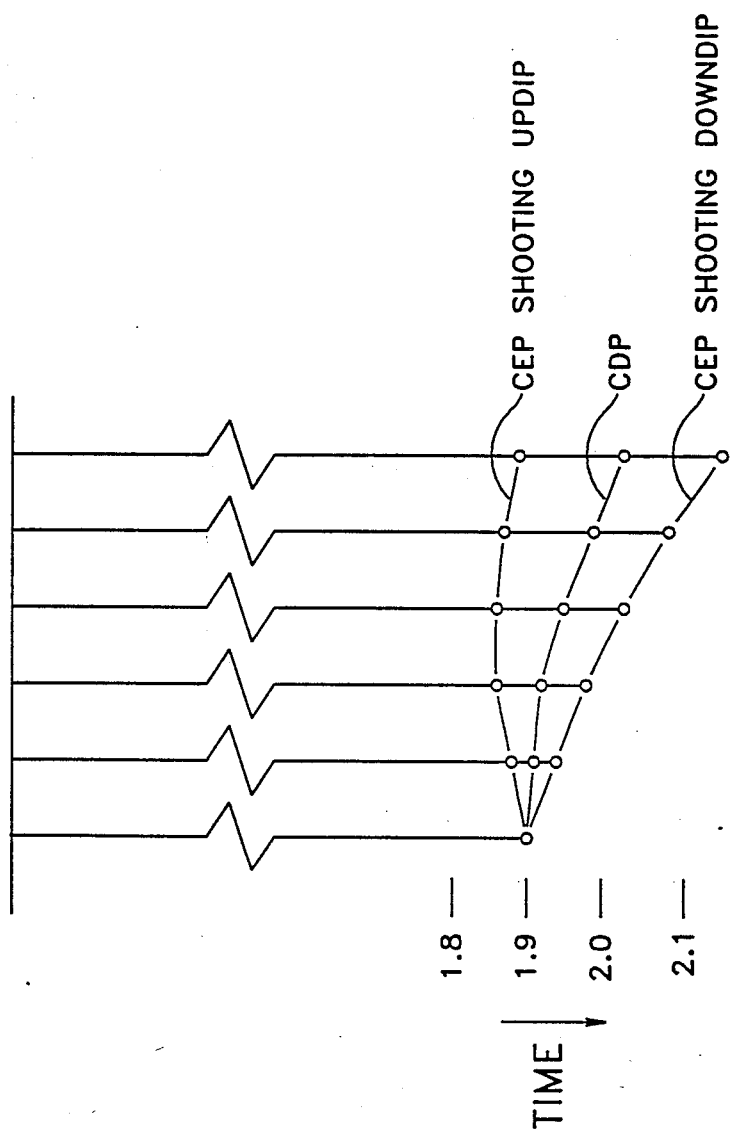
FIG. 6 is a representation of both CDP and CEP (downdip and updip) gathers of synthesized seismic signals obtained from FIGS. 3, 4 and 5, respectively.

Looking now to FIG. 6, a gather of seismic signals is depicted in which the connected circles separately represent the two-way traveltimes for the propagation of seismic energy along the various ray paths in FIGS. 3, 4, and 5. To correct for these traveltimes so that reflection events in the seismic signals accurately depict both the time and inclination of the reflecting interface, the seismic signals are time delay corrected. For CDP seismic data, the two-way traveltimes associated with seismic reflection events in each seismic signal can be corrected to compensate for time differences resulting from differences in ray paths according to:

$$T_x = \left( T_o^2 + \frac{X^2}{V^2} \right)^{\frac{1}{2}} \quad (1)$$

where
$T_o$ = normal incident two-way traveltime
$V$ = velocity of propagation; and
$X$ = offset between source and receiver generating seismic signal.

For common endpoint seismic data, Eq. 1 can be reformulated according to:

$$T_x = \left( T_o^2 + \frac{X^2}{V^2} + 2T_o \frac{X}{V} \sin\theta \right)^{\frac{1}{2}} \quad (2)$$

where $\theta$ = dip angle of reflecting interface.

For flat, horizontal reflecting interfaces, Eq. (2) reduces to Eq. (1); however, since many areas of geophysical interest include dipping (i.e., inclined) formations, it can be seen that two factors (i.e., velocity and dip angle) can affect the time delay correction when the common endpoint seismic technique is employed. Thus, the common endpoint seismic technique can provide additional means for distinguishing primary reflection events from multiple reflection events in the seismic data where structural dip exists.

Figure 7:
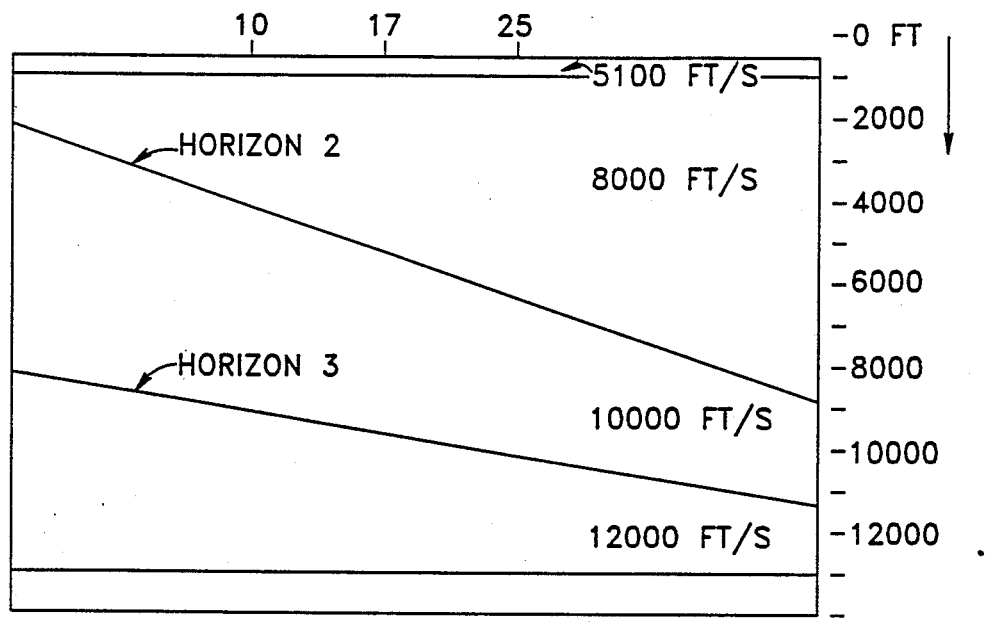
FIG. 7 is a model of a multilayer earth.
Figures 8A, 8B, 8C:
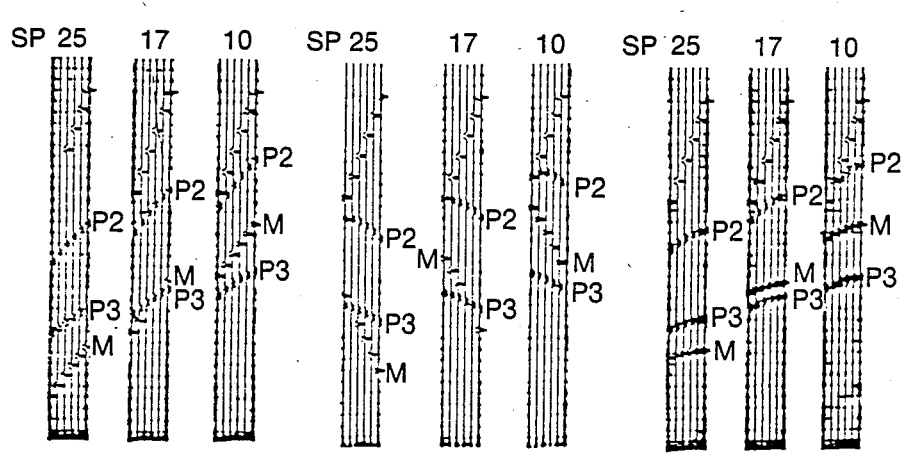
FIGS. 8a, 8b, and 8c each represent synthesized gathers of seismic signals from the model depicted in FIG. 7 obtained from shot points (SP) 10, 17 and 25, using common endpoint (updip), common endpoint (downdip) and CDP acquisition techniques, respectively.

Looking next to FIG. 7, a modeled substructure having reflecting horizons 2 and 3 is depicted wherein the velocities of each layer are shown superimposed thereon. Additionally, three shot record locations (SP10, SP17, and SP25) are shown. FIGS. 8A, B, and C show modeled gathers of seismic signals for each shot record location using the common endpoint (common source), common endpoint (common receiver), and common depth point seismic techniques, respectively. Primary reflection events from reflecting horizons 2 and 3 are identified in each gather of seismic signals as $P_2$ and $P_3$, respectively, whereas a multiple reflection event from horizon 2 in each gather of seismic signals is identified as M.

Employing the prior art approach for removing multiples from this modeled seismic data would be futile since it can be seen in FIG. 8C that the velocities of propagation of the multiple reflection event M and the primary reflection event $P_3$ are nearly identical. This is so because such approach employs differences in normal moveout velocities to operate successfully. However, FIG. 8A and 8B show that by obtaining common endpoint gathers of seismic signals rather than common depth point gathers of seismic signals, one has gained additional leverage for differentiating multiple reflection events from primary reflection events as exemplified by Eq. (2) since the time delay corrections to align primary reflection events and multiple reflection events are different.

Figure 9:
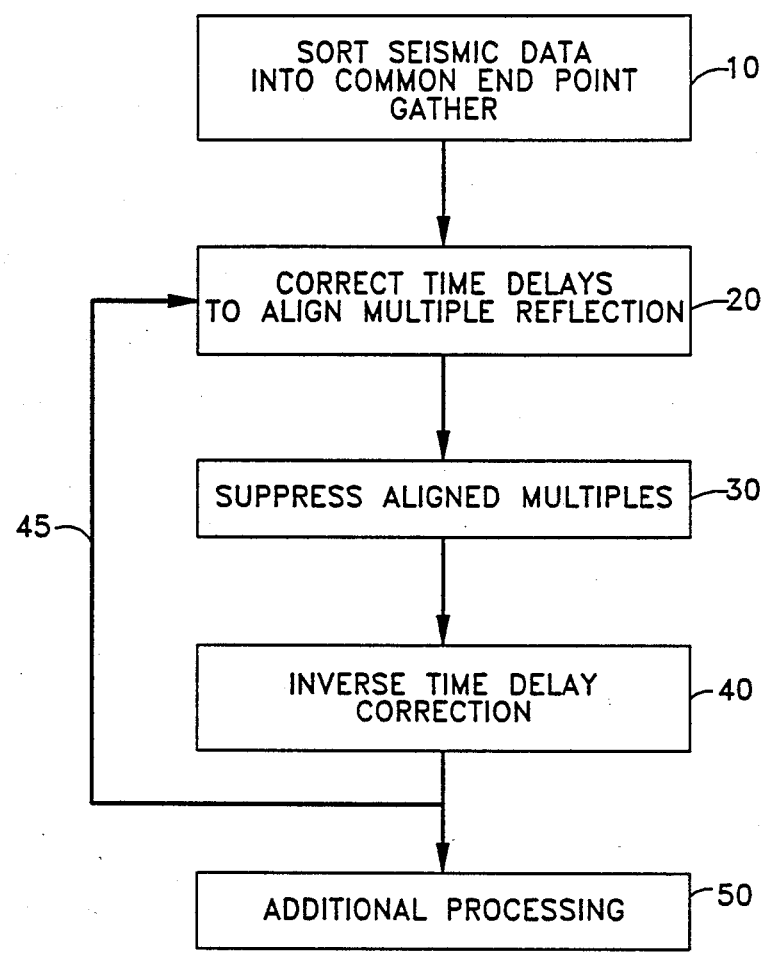
FIG. 9 is a flow diagram of the present invention.

Having developed additional means for distinguishing from primary reflection events from secondary reflection events, FIG. 9 provides a flow diagram whereby such advantages can be effectively employed to repetitively attenuate multiple reflection events in seismic data. At step 10, the seismic data are sorted into common endpoint gathers. As has already been seen, such common endpoint gathers can include common source point and common receiver point gathers of seismic signals. At step 20, a moveout analysis is conducted to determine the optimum time-velocity-inclination model to align selected multiple reflection events in the seismic data. Having determined the optimum time-velocity inclination model, Eq. 2 can be employed to determine the time delay shifts to apply to the common endpoint seismic data to correct for time delays associated with propagation of the seismic energy along the various assumed ray paths and to align the selected multiple reflection events. Preferably, the selected multiple reflection events are aligned so as to appear flat or horizontal across the common endpoint gather of seismic signals.

Having aligned the selected multiple reflection events in the seismic data, the aligned multiple reflection events can be suppressed at step 30. Although many techniques are available for attenuating aligned events in seismic data, it is preferable to attenuate such aligned multiple reflection events with a two-dimensional filter adapted to suppress aligned events. FK filters and time-dependent FK filters adapted to reject aligned events are exemplary of such two-dimensional filters and are described generally by H. J. Meyerhoff in "Two-Dimensional Filtering of Seismic Data," University of California, Berkeley, Extension Series (March 1967). At step 40, by inverse time delay correcting the enhanced seismic data from step 30, the enhanced seismic data can be restored to its original time-velocity-inclination characteristics and is thus available for additional processing at step 50. However, if additional multiple reflection events remain in the enhanced seismic data after step 40, steps 20–40 can be repeated via line 45 until such multiple reflection events have been suppressed. This step of repetitive multiple reflection event suppression is particularly novel since existing processes for attenuating multiple reflection events employing common depth point moveout and stacking are not amenable to such repetitive processing. Additionally, the ability to remove multiple reflection events and, as such, the gather of seismic signals no longer exists. The ability to remove multiples from the seismic data and yet restore the underlying gathers of the seismic signals free of multiples is particularly useful, especially when applying the RDA analysis techniques of Bodine, et al., and others.

The many features and advantages of the invention are apparent from this detailed description and the following claims are intended to cover all such features and advantages. Moreover, since numerous modifications and changes will be apparent to those skilled in the art, the present invention is limited only by the scope of the following claims.

What is claimed is

1. A method for attenuating multiple reflection events in seismic data, comprising the steps of:
    (a) sorting the seismic data into common endpoint gathers of seismic signals;
    (b) time-delay correcting each common endpoint gather of seismic signals for selected velocities and dip angles and aligning selected multiple reflection events therein; and
    (c) two-dimensional filtering the moveout corrected seismic signals to attenuate aligned selected multiple events and obtain enhanced seismic signals.

2. The method of claim 1 further including the steps of:
    (a) inverse time-delay correcting the enhanced seismic signal; and
    (b) repeating the steps of sorting, moveout correcting, and two-dimensional filtering for additional selected multiple reflection events in the seismic data.

3. The method of claim 1 wherein the step of sorting the seismic data into common endpoint gathers includes sorting the seismic data into common endpoint gathers selected from the group including common receiver gathers and common source gathers.

4. The method of claim 1 wherein the step of time-delay correcting includes the step of:
    optimizing a time-velocity-dip angle function according to:

$$T_x = \left( T_o^2 + \frac{X^2}{V^2} + 2T_o \frac{X}{V} \sin\theta \right)^{\frac{1}{2}} \quad (1)$$

where
X = offset between source and receiver generating seismic signal;
$T_o$ = normal incident two-way traveltime
V = velocity of seismic energy propagation; and
$\theta$ = dip angle.

5. A method of attenuating multiple reflection events in seismic data, comprising the steps of:
    (a) obtaining common endpoint gathers of seismic signals;
    (b) aligning selected multiple reflection events in the common endpoint gathers of seismic signals; and
    (c) impressing a two-dimensional filter on the seismic signals to attenuate aligned multiple reflection events and obtain enhanced seismic data.

6. The method of claim 5 wherein the step of aligning selected multiple reflection events comprises optimizing a time-dip angle, velocity function whereby the selected multiple reflection events are aligned horizontally across the CEP gather of seismic signals.

7. The method of claim 5 wherein the two-dimensional filter comprises an FK filter adapted to attenuate events aligned horizontally across the CEP gather of seismic signals.

8. The method of claim 7 wherein the FK filter is time variant.

9. A method for attenuating multiple reflection events in seismic data, comprising the steps of:
    (a) sorting the seismic data into common endpoint gathers of seismic signals;
    (b) aligning selected multiple reflection events in the common endpoint gathers of seismic signals by optimizing a time-dip angle velocity function;
    (c) filtering the common endpoint gathers of seismic signals to attenuate the aligned multiple reflection events; and
    (d) repeating steps (b) and (c) to align and attenuate other selected multiple reflection events.

10. A method for attenuating multiple reflection events in seismic data, comprising the steps of:
    (a) sorting the seismic data into common endpoint gathers of seismic signals;
    (b) aligning selected multiple reflection events in the common endpoint gathers of the seismic signals with an assumed velocity of propagation and an assumed dip angle;
    (c) filtering the common endpoint gathers of seismic signals to attenuate the aligned multiple reflection events; and
    (d) repeating steps (b) and (c) by assuming additional velocities of propagation and dip angles to align and attenuate other selected multiple reflection events.

* * * * *